INVENTOR
Peter Wargo
By John C. Slack
ATTORNEY

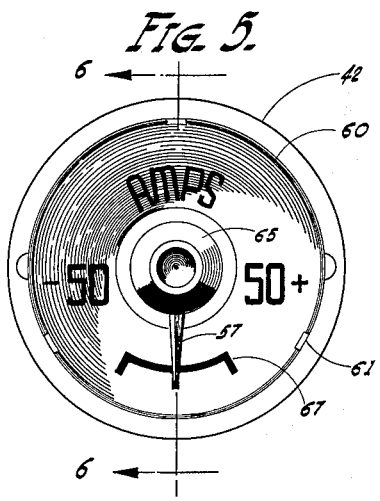
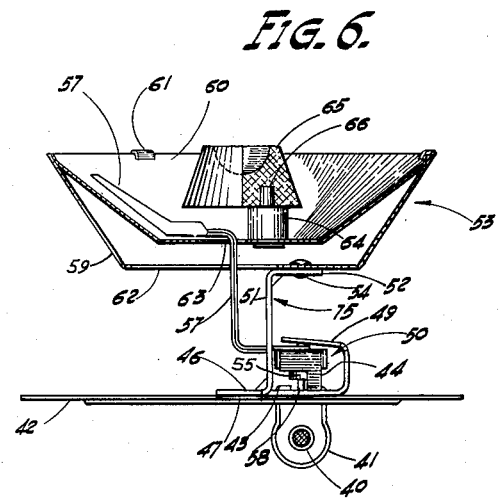
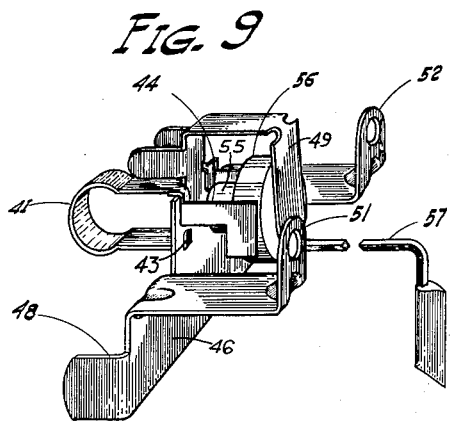
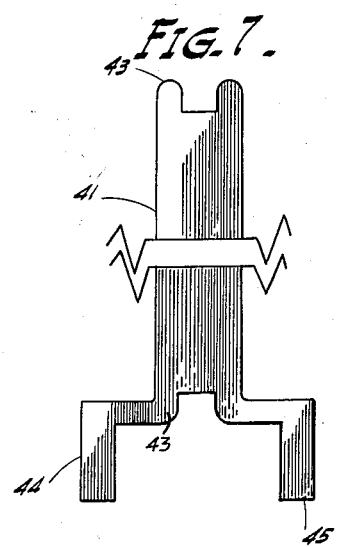
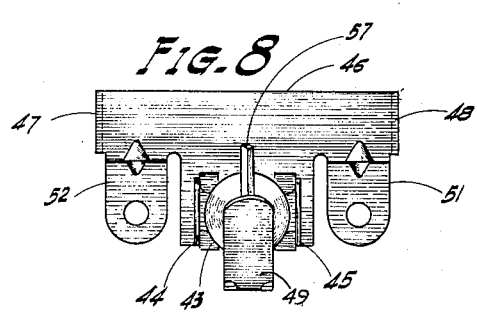

INVENTOR
PETER WARGO

BY John C Black
ATTORNEY

Dec. 12, 1961 P. WARGO 3,013,210
ELECTRICAL MEASURING INSTRUMENTS
Original Filed March 1, 1960 4 Sheets-Sheet 4

INVENTOR
PETER WARGO

BY John P. Black
ATTORNEY

United States Patent Office 3,013,210
Patented Dec. 12, 1961

3,013,210
ELECTRICAL MEASURING INSTRUMENTS
Peter Wargo, Maywood, Ill., assignor to Stewart-Warner Corporation, Chicago, Ill., a corporation of Virginia
Continuation of application Ser. No. 12,234, Mar. 1, 1960. This application Dec. 9, 1960, Ser. No. 75,038
25 Claims. (Cl. 324—146)

This invention relates to magnetic measuring instruments and more particularly to an ammeter mechanism. In the vehicle instrument field, it is necessary to provide electrical indicating instruments which are accurate yet very low in cost and which may be feasibly produced by mass production techniques. This application is a continuation of my copending application Serial No. 12,234, filed March 1, 1960, which was a continuation-in-part of my application Serial No. 680,199, filed August 26, 1959, both now abandoned.

Accordingly, it is a primary object of the present invention to provide an accurate yet very low cost magnetic ammeter mechanism which is adapted to mass production techniques.

It is another object of the present invention to provide a low cost magnetic ammeter mechanism which may be calibrated in a very simple, economical manner.

Another object is the provision of the improved distorted scale mechanism.

Another object is the provision of an exceedingly simplified, low cost ammeter mechanism having high torque and ease of calibration which is capable of being energized by high current values yet capable of accurately operating electrical circuit controlling contacts at predetermined low current values.

A feature of the present invention is the provision of a current conducting element around which is disposed a field plate having an air gap, a circular disk-like magnet pivoted in close proximity to the air gap, and a pair of projections on the field plate projecting upwardly on diametrically opposed sides of the magnet to provide a simple yet reliable zero return, biasing means, and calibration means.

Another feature is the provision of an ammeter mechanism capable of operating electrical contacts characterized by a current conducting element around which is disposed a field plate having an air gap, a circular disk-like magnet pivoted in closed proximity to the air gap, a pair of projections on the field plate on diametrically opposed sides of the magnet to provide a zero return and biasing means, a low torque spring connected to the magnet for calibration, and an electrical coil wound about the field plate and energized under certain conditions for further biasing the magnet.

Other objects and features will be evident upon a perusal of the following description in which:

FIG. 5 is a plan view of another embodiment of the invention;

FIG. 6 is an enlarged elevation view partially in section and generally along line 6—6 of FIG. 5;

FIG. 7 is a plan view of the field plate of FIG. 6 before being bent to the required shape;

FIG. 8 is a plan view of the frame, magnet, and field plate;

FIG. 9 is a perspective view of the frame, field plate, and magnet assembly;

Particular reference is first directed to FIGS. 1–4 which disclose one embodiment of a magnetic vehicle ammeter. It can be seen that the ammeter 1 comprises a conventional face dial 2 (FIG. 1) having a scale marked thereon and a cooperating movable pointer 3.

Figure 1:
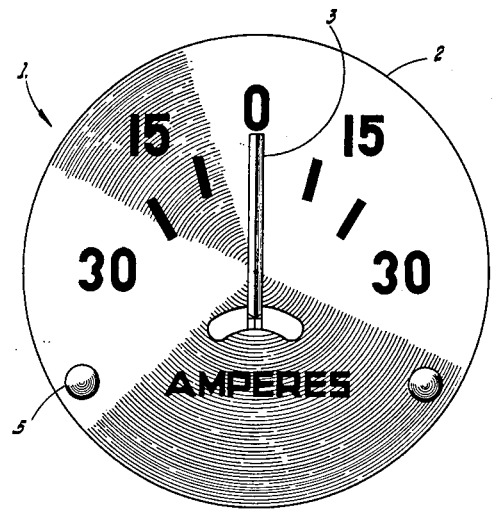
FIG. 1 is a plan view of one embodiment of the invention.
Figure 3:
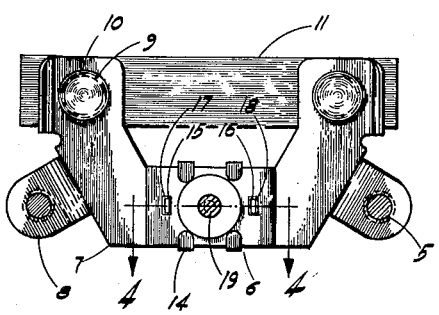
FIG. 3 is a plan view of the frame and field plate along line 3—3 of FIG. 2.
Figure 2:
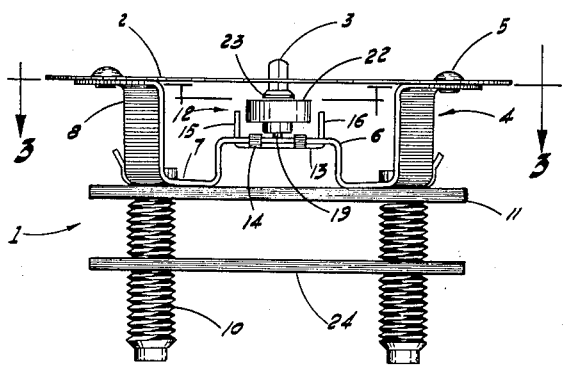
FIG. 2 is an elevation view of the embodiment shown in FIG. 1.

A frame 4 (FIG. 2) is secured to the face dial 2 by conventional means, for example, by rivets 5. The frame 4 may be formed from any suitable nonmagnetic conducting material, for example, brass. As best seen in FIGS. 2 and 3, frame 4 includes an inverted generally U-shaped section 6 with a pair of wings 7 extending outwardly and rearwardly from the bottom of the section 6 in either direction in a plane parallel to the upper base portion. Intermediate the ends of each wing 7 is an upwardly projecting L-shaped supporting ear 8. The upper ends of ears 8 are riveted to the dial face 2 by the rivets 5.

Apertures 9 (FIG. 3) are provided toward the outer extremities of wings 7 for receiving a pair of mounting studs 10 which are utilized to mount the ammeter 1 on a vehicle frame (not shown) and also to provide the electrical circuit connections for the ammeter. A mounting plate 11 of any suitable insulating material is rigidly secured to the mounting studs 10 immediately adjacent the frame 4 to electrically insulate the frame 4 from the vehicle frame.

A field plate 12 (FIG. 2) having a substantially square base 13 is secured to the lower surface of the base of the U-shaped section 6 by means of four spaced lugs 14 (FIG. 3) which are rolled over the upper surface of the base of section 6. The field plate 12 may be formed from a sheet of any suitable nonpermanent magnetic material, for example, soft iron. The field plate 12 also includes a pair of parallel projections 15 and 16 extending upwardly through a pair of apertures 17 and 18 (FIG. 3) in the base of the U-shaped section 6. The projections 15 and 16 are preferably narrow and of rectangular cross section.

A pivot shaft 19 (FIG. 4) of a suitable steel alloy material is pressed through apertures 20 and 21 respectively of the bases of the U-shaped section 6 and the field plate 12. A circular disk permanent magnet 22 pressed on a bushing 23 is rotatably mounted on the pivot shaft 19. The bushing 23 has a bore 30 at its lower end adapted to receive the pivot shaft 19.

The pivot shaft 19 (FIG. 3) is coaxial with a line drawn perpendicularly through the geometric center of the bases of the U-shaped section 6 and the field plate 12. The lugs 14 are spaced symmetrically with respect to the axis of the pivot shaft 19 and therefore symmetrically with respect to the axis of the permanent magnet 22. The space between the juxtaposed lugs at the ends of the field plate 12 form an air gap for magnetic flux produced by current flowing in the base of section 6 by way of a circuit extending from one of the mounting studs 10 through one of the wings 7, the U-shaped section 6, the other wing 7 and the other mounting stud 10. The base 13 of the field plate 12 provides the remaining internal portion of the flux path.

The projections 15 and 16 (FIG. 2) together with the base 13 of the field plate 12 provide the shortest possible path for the magnetic flux produced by the magnet 22. Consequently, with no current flowing through the base of the U-shaped section 6, the magnet 22 will assume a position in which its two magnetic poles are in alignment with the projections 15 and 16. This position is the "zero return" position of the ammeter. It is in this zero return position that the pointer 3 and the scale of the face dial 2 are relatively positioned to indicate no current flowing in either direction through the ammeter 1.

The above described frame, field plate and magnet assembly provides an unusually low cost yet accurate ammeter mechanism.

The pointer 3 is rigidly secured to the upper end of the bushing 23, for example, by staking, for movement with the bushing 23 and magnet 22.

Shunting bars 24 may be connected across the mounting studs 10 in a manner well known in the art for the purpose of providing one ammeter mechanism assembly for meters of varying sensitivity, for example, 30, 45, 60 and 75 amperes.

The lower surface of the face dial 2 provides an abutment against which the upper surface of the pointer 3 and the bushing 23 will be deflected in the event that severe shocks in the vehicle cause the bushing 23, the magnet 22 and pointer 3 to bounce upwardly on the pivot shaft 19. The pointer, magnet and bushing assembly will merely bounce off the lower surface of the face dial 2 and return to its normal lower position on the pivot shaft 19. The magnet 22 normally holds itself on the shaft 19 due to its tendency to shorten its magnetic path through the field plate 12. A viscous damping fluid may be applied to the shaft 19 and the bore 30. This arrangement provides a much more economical magnet pivoting means than the conventional method of pivoting the pointer, magnet and bushing assembly at both ends.

A description of the operation of the ammeter 1 will now be made. When current passes from one of the mounting studs 10 through the frame 4 to the other mounting stud 10, the current passing through the base of the U-shaped section 6 will produce a transverse annular flux field proportional in intensity to the value of the current flow therethrough. The direction of the current will, as is well known in the art, determine the direction of the flux.

As is well known, substantially all of the flux produced will seek a path of lowest reluctance. Consequently, substantially all of the flux will follow a path including the base 13 and lugs 14 of the field plate 12 and the air gap between opposed lugs 14. This flux flowing through the air gap will interact with the magnetic flux field of the permanent magnet and cause the magnet to be urged in a direction in which its north and south poles will be in alignment with the flux path in the air gap.

It will be remembered that with no current passing through the base of the U-shaped section 6, the poles of the magnet 22 are in alignment with the projections 15 and 16 of the field plate 12 and therefore perpendicular to the magnetic flux path in the air gap. Consequently, when current flowing in the case of the U-shaped section 6 tends to urge the magnetic poles to align themselves with the flux produced by the current, the magnet will rotate in a direction determined by the direction of the current in the base of section 6 and to an angular position determined by the intensity of the field produced by the current.

When the flux in the air gap, produced by the current, interacts with the field of the magnet to tend to rotate the magnet, the projections 15 and 16 and the base 13 of the field plate 12 and the field of the permanent magnet 22 act as a biasing means to resist angular deflection of the magnet 22. Consequently, the magnet 22 rotates to a position in which the biasing force is equal in intensity to the opposing force produced by the interaction of the fields of the magnet 22 and the current.

The pointer 3 rotates with the magnet 22 to a position on the scale of the face dial 2 to indicate the amount of current and its polarity.

Calibration of the sensitivity of the ammeter 1 is effected in a very simple economical manner by adjusting the distance between the projects 15 and 16 of the field plate 12 and the magnet 22. One simple method of calibrating is the use of long-nose pliers to squeeze the projections 15 and 16 toward the magnet 22 or to expand them outwardly away from the magnet.

Particular reference is now made to FIGS. 5–9 which show a second embodiment of the "loop" type. Attention is directed to FIG. 6 which is a view only partially taken along line 6—6 of FIG. 5. More particularly, a plane through line 6—6 bisects the axis of the magnet assembly 50. However, to more clearly show the invention, a nonsectional elevation view is taken of the assembly and its associated mounting means. As may be seen in FIG. 6, a loop type ammeter does not use a specially designed current carrying frame element. Instead, a conventional electrical conductor 40 is threaded through a generally annular field plate 41 formed from a non-permanent magnetic material. The field plate 41 is rigidly secured to a mounting plate 42. The field plate 41 includes four lugs 43 which define an air gap in a manner similar to the air gap defined by the lugs 14 (FIG. 3). Two of the lugs 43 have a pair of L-shaped ears 44 and 45 projecting upwardly. The upper portion of the ears 44 and 45 are disposed symmetrically with respect to the transverse plane passing perpendicularly through the geometric center of the air gap and serve the same purpose as the projections 15 and 16 (FIG. 2), that is, the ears 44 and 45 provide a zero return, a biasing means and a calibrating means. FIG. 7 shows the shape of the field plate 41 before it is formed as shown in FIGS. 6 and 8.

A frame 75 has its base 46 rigidly secured between the mounting plate 42 and the lugs 43 by means of a pair of tabs 47 and 48 inserted through apertures (not shown) in the mounting plate 42 and rolled over on the bottom surface of the mounting plate 42. The base 46 has an L-shaped projection 49 extending upwardly therefrom and across the top of a permanent magnet assembly 50 to prevent the magnet assembly from being dislodged from its pivot shaft in much the same manner that the face dial 2 (FIG. 2) prevents the magnet 22 and its bushing 23 from being dislodged from the pivot shaft 19. The top horizontal portion of the L-shaped projection 49 is bent from a vertical to its shown horizontal position only after the magnet assembly 50 is mounted in the position shown in FIG. 6.

The frame 75 also comprises a pair of upwardly extending L-shaped projections 51 and 52, the upper horizontal portions of which carry a face dial assembly 53. The face dial assembly 53 may be secured to the frame 75 by rivets 54.

The magnet assembly 50 comprises a circular bushing 55, a circular permanent magnet 56 rigidly secured to the bushing 55, and a pointer 57 staked to the top of the bushing 55. The lower central portion of the bushing 55 has an axial bore therein adapted to receive a pivot shaft 58 which shaft is rigidly secured to the frame 75 and the mounting plate 42 in the geometric center of the air gap. Thus, the magnet 56 is symmetrically disposed with respect to the lugs 43 and the ears 44 and 45.

The face dial assembly 53 comprises a cup-shaped dial support 59 and a cup-shaped face dial 60 (FIG. 6). The face dial 60 is rigidly secured to the dial support 59 by means of three spaced lugs 61 (FIG. 5) on the dial support 59 which lugs are bent over the dial face 60. The dial support 59 and the dial face 60 include apertures 62 and 63 respectively for receiving therethrough the pointer 57.

The face dial 60 carries a mounting stud 64 which is riveted to the face dial 60. A truncated conical medallion 65 is pressed on a projection 66 at the upper end of the mounting stud 64.

The pointer 57 cooperates with a scale 67 (FIG. 5) marked on a face dial 60 to indicate the polarity and intensity of the current passing through the conductor 40.

The operation of the embodiment disclosed in FIGS. 5–8 is substantially similar to the operation of the embodiment shown in FIGS. 1–4 and will be described only briefly. With no current passing through the conductor 40, the magnet 56 will be in its zero return position with its magnetic poles in alignment with the centers of the upper horizontal portions (FIG. 6) of the ears 44 and 45. When an electrical potential causes current to flow in the conductor 40, a magnetic field perpendicular to the field of the magnet 56 will be produced proportional in intensity to the amount of current and of a direction determined by the direction of current flow. The flux produced by the current will flow through the field plate 41 and its air gap. The magnetic field in the air gap will interact with the field of the magnet to rotate the magnet to a position determined by the amount of current and therefore the intensity of the magnetic field in the air gap and determined by the polarity of the current.

The use of the field plate lugs 14 and 43 of the first and second embodiments respectively, positively limits the maximum angular displacement of the magnets 22 and 56 respectively from their zero return positions. For example, when the current in conductor 40 is sufficiently high to rotate the magnet 56 to a position in which its magnetic poles are in alignment with angularly opposite lugs 43, the air gap between the lugs and the magnet will be at a minimum length. With the air gap being minimum, a higher intensity current will not affect the position of the magnet as is well known in the art.

Thus, excessive current and sporadic surges of current cannot rotate the magnet and pointer beyond the desired limits.

The term "generally annular" in the appended claims is used in its broadest sense to define that which encircles an object whether the shape taken is circular or noncircular and whether the object is completely or partially encircled. The phrase "plane of the air gap" is used in the apepnded claims to describe a plane which is defined by imaginary straight lines drawn through the opposed lugs 14 of FIG. 3 (and lugs 43, FIG. 8). With the lugs 14 as shown in FIG. 3, this plane will be parallel to the plane of the sheet. The phrase "plane of polarization" is used in the appended claims to describe a plane which is defined by lines drawn from one magnetic pole to the other of the magnet 22 of FIG. 3 (and magnet 56 of FIG. 8). With the magnet 22 in the position shown in FIG. 3, this plane will be parallel to the plane of the sheet.

The embodiments shown in FIGS. 1–9 are linear, symmetrical scale ammeters. It will be appreciated that distorted scale ammeters may be made utilizing the features of the present invention.

Figure 10:
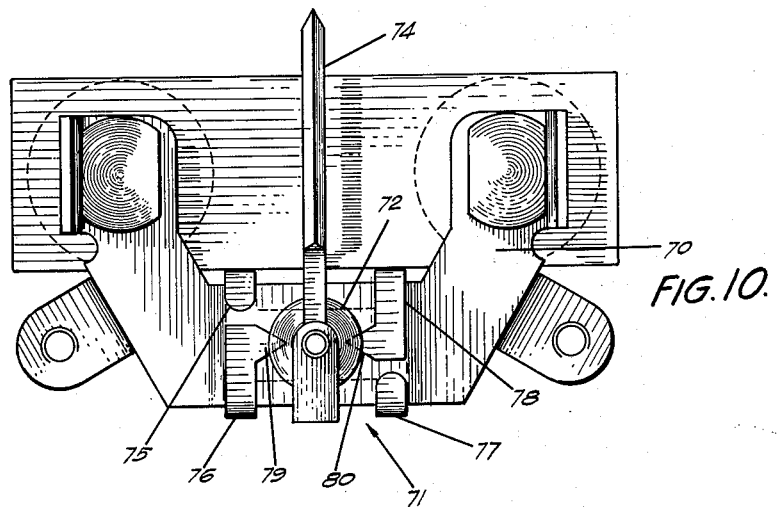
FIGS. 10 and 11 are plan and elevation views of a distorted scale embodiment.
Figure 11:
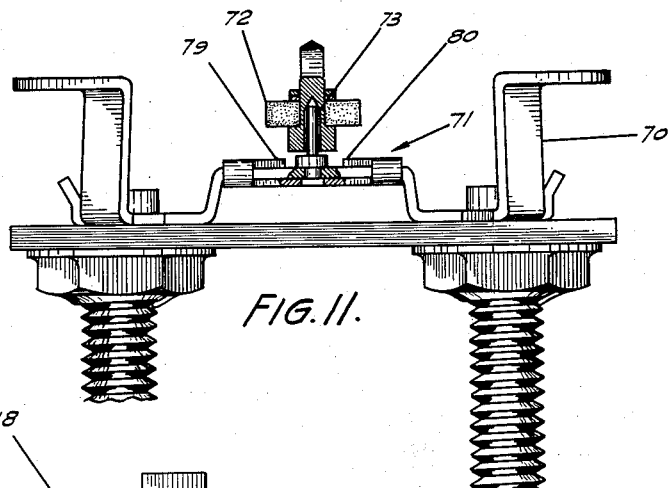
Figure 15:
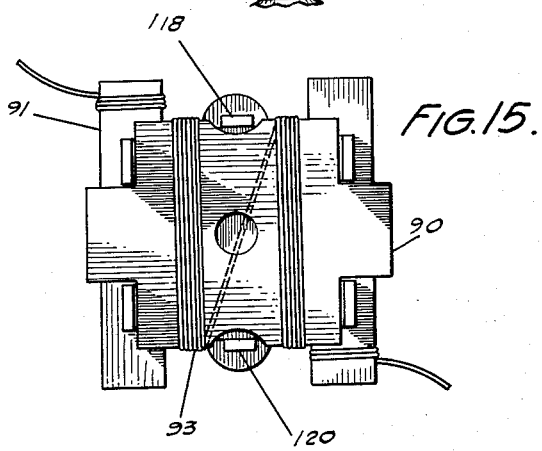
FIGS. 12, 13, 14 and 15 are views of a further embodiment especially adapted for operating electrical contacts.
Figure 12:
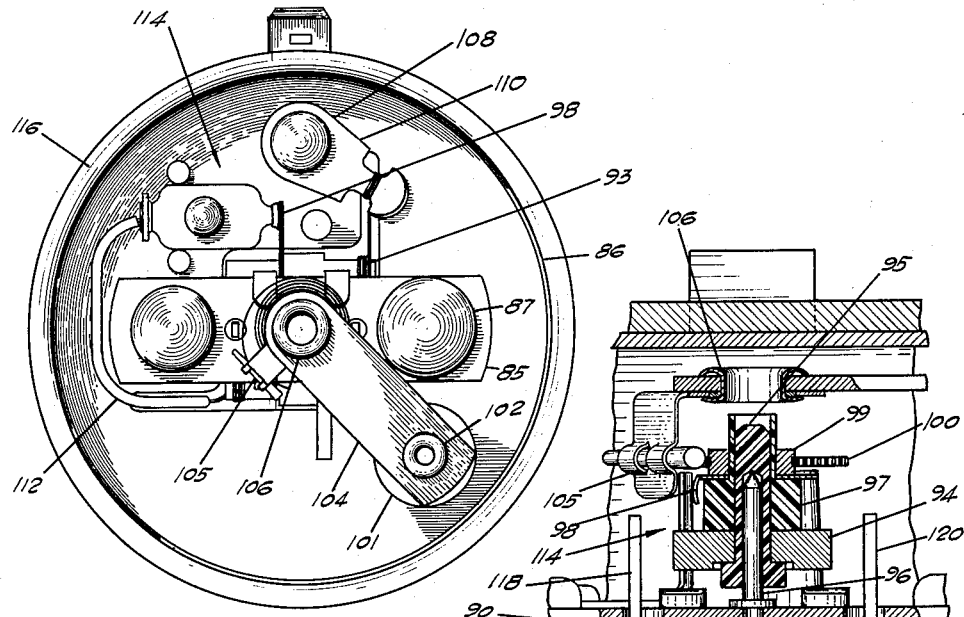
Figure 14:
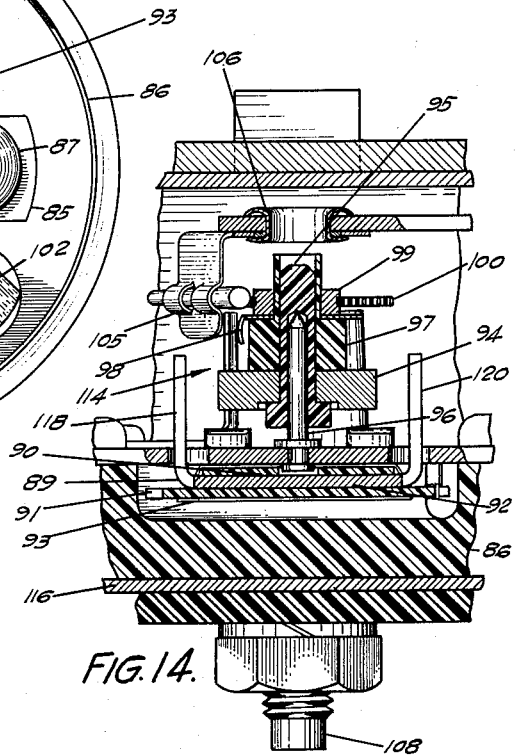
Figure 13:
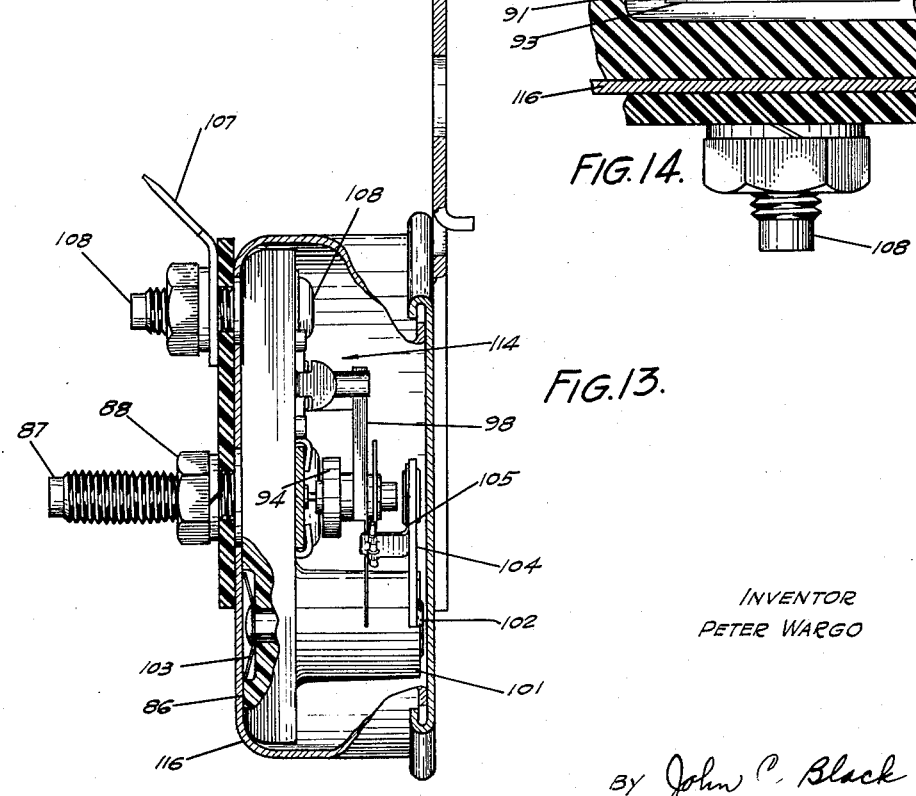

FIGS. 10 and 11 illustrate a preferred form of a distorted scale ammeter utilizing the teachings of the present invention. This embodiment includes a current conducting frame 70, a field plate 71 and a permanent magnet 72. A pivot shaft 73 carries the magnet 72 and a pointer 74.

The field plate 71 has four tabs 75, 76, 77 and 78 for defining an air gap for flux produced by current flowing in the frame 70. The zero return and biasing means in this embodiment is provided by triangular extensions 79 and 80 on the tabs 76 and 78 respectively. These extensions are in the same plane (FIG. 11) as the tabs. However, since they extend directly under the magnet, the field plate is closest to the magnet in these positions. Hence the magnet in seeking its shortest magnetic path will align its magnetic poles with the pointed ends of the extensions.

The operation of the embodiment of FIGS. 10 and 11 will now be described. When current is passed through the frame 70 in one direction, the resulting flux will energize the tabs 76 and 77 to one polarity and the tabs 75, 78 to the opposite polarity. Assume that tab 76 has the same polarity as the adjacent pole of the magnet and that the tab 78 has the same polarity as its adjacent magnet pole. The tab extensions 79 and 80 will be of the same polarity as the adjacent magnet poles. Under these conditions, increases in the flux in the air gap between opposed tabs resulting from a corresponding increase in the current intensity will cause greater change in the angular position of the pointer 74 and the magnet 72 than would be obtained with a corresponding change in current in the embodiment of FIGS. 2–4. This condition occurs because the magnet poles and the adjacent tab extensions are of the same polarity and therefore repel one another. As a result, it requires less change in flux density in the air gaps to rotate the magnet.

On the other hand when the current is passed through the frame 70 in the opposite direction, the juxtaposed magnet poles and tab extensions will be of opposite polarity and therefore attracting. As a result a substantially greater flux density in the air gaps is required to rotate the magnet.

Hence it can be seen that the rate of magnet rotation for a given increase in current value will be substantially higher for currents in one direction than it is for currents flowing in the opposite direction. One mechanism substantially identical to that shown in FIGS. 10 and 11 exhibits full scale deflection in one direction in response to a 10 ampere current and full scale deflection in the opposite direction in response to a 20 ampere current flowing in the opposite direction.

FIGS. 12–15 show a further embodiment of the ammeter mechanism which has been specifically adapted for actuating a pair of circuit controlling electrical contacts. This embodiment comprises a flat rectangular current conducting frame 85 secured to a circular insulator block 86 by means of studs 87 and screws 88.

Figure 4:
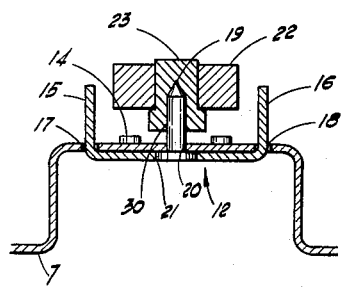
FIG. 4 is an enlarged partial section along line 4—4 of FIG. 3.

A field plate 89 similar to the field plate 12 of FIGS. 2–4 is secured to the frame 85. A pair of flat insulators 90 and 91 are disposed on either side of the base 92 of the field plate 89. A coil 93 is wound around the base 92 and the insulators 90 and 91. The insulating block 86 is apertured to receive the field plate 89 and the insulators 90 and 91.

A circular disk-like magnet 94 is pressed on an insulating bushing 95, which bushing is rotatably carried by a pivot shaft 96. The bushing 95 also carries a hub-like insulating spacer 97. A metallic contact arm 98 is received on the upper reduced portion of the spacer 97. The hub 99 of a bias spring 100 is pressed on the upper portion of the spacer 97. The hub holds the contact arm 98 in place axially of the pivot shaft and provides substantial resistance to angular displacement of the arm. However, the angular position of the arm relative to the magnet may be manually adjusted during assembly and calibration. The arm rotates with the magnet as it is operated under the influence of flux produced by current in the frame 85.

A metallic post 101 is secured to the insulating block 86 by means of a rivet 102 and spring washer 103. A rigid metallic arm 104 is secured to the post 101 by means of the rivet 102. The outer free end of the arm 104 carries a spring adjustment lever 105 secured to the arm 104 by a rivet 106. The free end of the bias spring 100 is rigidly secured to the lever 105. The lever 105 is movable against the friction of the arm 104 and rivet 106 to adjust the torque applied to the magnet by the spring 100.

An electrical circuit is completed from the terminal 107 to ground by way of terminal stud 108, terminal 110, coil 93, conductor 112, stationary contact assembly 114, contact arm 98, hub 99, spring 100, lever 105, arm 104, post 101, spring washer 103, and the grounded case 116. It can be seen that the circuit from the terminal 107 to ground is completed while the contact arm 98 is in engagement with the stationary contact assembly 114 and that the circuit is broken when the arm 98 is moved from engagement with the contact assembly by rotation of the magnet 94. In a typical vehicle installation, the terminal 107 will be connected to one side of an alarm device, for example, an electric light bulb (not shown). The ungrounded terminal of the vehicle battery (not shown) will be connected to the other side of the alarm device. Therefore, the alarm device will be energized or deenergized depending upon whether the arm 98 is in engagement with or out of engagement with the contact assembly 114.

In the preferred embodiment, the torque of the calibrating spring 100 is very small in relation to the zero return torque provided by the magnet 94 and the zero return tabs 118 and 120 of the field plate 89. In the preferred embodiment, this torque of the spring 100 opposes zero return force. This assures simple, effective and accurate calibration of the initial contact pressure between the arm 98 and the contact assembly 114. At the same time, the spring affords a friction-free electrical contact connection between the moving arm 98 and the stationary ground connection means described above.

The frame 85 defines a low resistance path for current flow and exhibits in one group of samples no appreciable heating when subjected to currents as high as 60 amperes. On the other hand, the mechanism may be calibrated by the spring 100 to accurately and reliably open and close the circuit connection between the contact assembly 114 and the arm 98 at selected low values of current flow in the frame 85. For example, in the said group of devices now being tested in vehicles, the circuit connection between the contact assembly 114 and the arm 98 is being broken accurately and reliably at 5 ampere current flows in the frame 85 and is being reestablished at 2 ampere current flows. The 3 ampere current differential has been achieved by proper selection of number of turns in the coil 93 and the current flow therethrough.

In this group of devices, the 3 ampere differential is provided primarily to prevent intermittent making and breaking of the contacts at the critical current value. For example, without the coil there might be a tendency for the contacts to "chatter" when the current in the frame is 2 amperes. However, with the coil being introduced to provide a differential, the coil will be energized once the contacts close and will immediately bias the contacts to prevent their opening until the current reaches 5 amperes or more. Then when the contacts open at 5 amperes, the coil is deenergized and the contacts may not again close until the current is reduced to 2 amperes. This assures positive operation of the alarm device under conditions of extreme vibration.

The operational characteristics of the embodiment of FIGS. 12-15 are very important for new vehicle electrical systems being introduced. These new systems utilize an A.C. alternator and a rectifier circuit in place of the conventional D.C. generator.

In the systems using the conventional D.C. generator, the reverse current from the battery when the generator output is too low is utilized to actuate the alarm device. This reverse current operates a well known cutout which is provided for preventing flow of current from the battery to the generator. This same cutout, when actuated by the reverse current, also energizes the alarm device.

In the new systems utilizing an alternator and rectifier, no cutout device is necessary since the rectifier prevents reverse flow of current. Hence a different device must be provided for energizing the alarm device in the event that the rectifier output is so low as to indicate a fault in the alternator or rectifier.

A switch for operating the alarm device must be placed in series with the output of the rectifier circuit. Therefore, the switch must accept very high current flows, for example 60 amperes, without appreciable heating. At the same time, it must operate to energize the alarm device at unusually low current flows, for example 2 amperes. This rigid requirement is not satisfied by conventional relay devices. The embodiment of FIGS. 12-15 is a low cost reliable and accurate device satisfying this requirement.

While there have been shown what is at present believed to be the preferred embodiments of the invention, it will be understood that various changes and modifications may be made therein; and it is contemplated to cover in the appended claims all such changes and modifications as fall within the true spirit and scope of the invention.

What is claimed is:

1. A low cost magnetic ammeter mechanism comprising a current conducting element of a nonmagnetic material, a field plate of a nonpermanent magnetic material partially encircling a longitudinal section of the element to define an internal low reluctance path portion for flux generated by current flowing in the element and having a transverse peripheral air gap defining an external flux path portion, a disk-like permanent magnet rotatably mounted in proximity to the air gap on an axis generally perpendicular to the plane of the air gap with its plane of polarization generally parallel with the plane of the air gap, and a pair of projections on the field plate each having a segment disposed in substantially diametrically opposite positions on either side of the magnet and disposed closest to the magnet in such positions, such positions defining a plane disposed at an angle with the direction of the current produced flux in the air gap, whereby the field plate projections control the sensitivity of the ammeter and provide a zero return and biasing means for the magnet.

2. A low cost magnetic ammeter mechanism comprising a current conducting element of a nonmagnetic material, a field plate of a nonpermanent magnetic material disposed generally annularly around a longitudinal section of the element to define an internal low reluctance path for flux generated by current flowing in the element, and having a transverse air gap defining an external flux path, a disk-like permanent magnet rotatably mounted in proximity to the air gap on an axis generally perpendicular to the plane of the air gap with its plane of polarization generally parallel with the plane of the air gap, and a pair of projections on the field plate extending symmetrically to diametrically opposite positions on either side of the magnet in proximity thereto and being closest to the magnet at points in a plane defining an angle with the direction of the current produced flux in the air gap, whereby the field plate projections control the sensitivity of the ammeter and provide a zero return and biasing means for the magnet.

3. A low cost magnetic ammeter mechanism comprising a current conducting element of a nonmagnetic material, a field plate of a nonpermanent magnetic material partially encircling a longitudinal section of the element to define an internal low reluctance path portion for flux generated by current flowing in the element and to define an external high reluctance air gap path portion for the flux, a pair of spaced field plate projections extending symmetrically into the air gap from each edge of the field plate adjacent the air gap to further define the external flux path portion, a disk-like permanent magnet rotatably mounted in proximity to the air gap on an axis generally perpendicular to the plane of the air gap with its plane of polarization generally parallel with the plane of the air gap, and an additional pair of projections on the field plate each having a segment disposed in substantially diametrically opposite positions on either side of the magnet and disposed closest to the magnet in such positions, such positions defining a plane disposed at an angle with the direction of the current produced flux in the air gap, whereby the field plate projections control the sensitivity of the ammeter and provide a zero return and biasing means for the magnet.

4. A low cost magnetic ammeter mechanism comprising a current conducting element of a nonmagnetic material, an open-ended field plate of a nonpermanent magnetic material generally encircling the element, open ends of the field plate defining an air gap therebetween, said field plate and air gap defining a path for magnetic flux produced by current flowing through the element, a disk-like permanent magnet rotatably mounted in proximity to the air gap on an axis generally perpendicular to the plane of the air gap with its plane of polarization generally parallel with the plane of the air gap, and a pair of projections on the field plate, each having a segment disposed in substantially diametrical opposite positions on either side of the magnet and disposed closest to the magnet in such positions, such positions defining a plane disposed at an angle with the direction of the current produced flux in the air gap, whereby the field plate projections control the sensitivity of the ammeter and provide a zero return and biasing means for the magnet.

5. The combination claimed in claim 4 wherein each open end of the field plate comprises a pair of spaced projections extending into the air gap to further define the current produced flux path and to limit the maximum angular displacement of the magnet from its zero return position.

6. A low cost magnetic ammeter mechanism comprising a current conducting element of a nonmagnetic material, a field plate of a nonpermanent magnetic material partially encircling a longitudinal section of the element to define an internal low reluctance path section for flux produced by current flowing in the element and having a transverse peripheral air gap defining an external flux path section, a pivot shaft disposed substantially in the geometric center of the air gap with its axis generally perpendicular to the plane of the air gap, a disk-like permanent magnet rotatably mounted on and coaxial with the shaft in proximity to the air gap with its plane of polarization generally parallel with the plane of the air gap, a pair of projections on the field plate extending symmetrically to substantially diametrically opposite positions on either side of the magnet in proximity thereto and being closest to the magnet in a plane generally transverse to the length of the air gap at its geometric center, whereby the field plate projections control the sensitivity of the ammeter and provide a zero return and biasing means for the magnet, an abutment surface adjacent the axial end of the magnet opposite its pivotal mounting end to prevent dislodgement of the magnet from the pivot shaft, and a viscous fluid applied to the pivot shaft for damping vibration of the magnet on the shaft.

7. A low cost magnetic ammeter mechanism comprising: a frame of a nonmagnetic electrical current conducting material having a generally U-shaped section; a field plate of a nonpermanent magnetic material secured to the base of the U-shaped section, said field plate having a base extending laterally across one side of the base of the U-shaped section and pairs of projecting lugs rolled over opposite longitudinal edges of the base of the U-shaped section to define a flux path with an air gap on the other side of the base of the U-shaped section; a disk-like permanent magnet rotatably mounted in proximity to the air gap, on an axis generally perpendicular to the plane of the air gap, substantially at the geometric center of the air gap, and with its plane of polarization generally parallel to the plane of the air gap; and a pair of projections on the field plate extending symmetrically to substantially diametrically opposite positions on either side of the magnet in proximity thereto and being closest to the magnet in a plane generally transverse to the length of the air gap at its geometric center, whereby the field plate projections control the sensitivity of the ammeter and provide a zero return and biasing means for the magnet.

8. A low cost ammeter comprising: a frame of a nonmagnetic electrical conducting material having a generally U-shaped section; a pivot shaft secured to the frame and projecting perpendicularly from the base of the section; a disk-like magnet rotatably carried by the pivot shaft with its plane of polarization being generally perpendicular to the axis of the shaft; a face dial having a scale; an indicating pointer secured to the magnet and disposed for movement across the scale; a field plate of a nonpermanent magnetic material secured to the base, said field plate having a main portion extending laterally across one side of the base and pairs of projecting lugs rolled over opposite edges of the base to provide a flux path with an air gap on the other side of the base adjacent the magnet and said field plate having a pair of projections extending from the base generally parallel to and on opposite sides of the pivot shaft in close proximity to the magnet to provide a zero return, a biasing means, and a calibrating means for the magnet; an abutment surface on the face dial disposed adjacent the end of the magnet opposite its pivoted mounting end to prevent dislodgement of the magnet from the shaft; and a viscous fluid applied to the shaft to damp vibration of the magnet on the shaft.

9. A low cost magnetic ammeter mechanism comprising a generally annular field plate of a nonpermanent magnetic material adapted to receive therethrough an electrical conducting element the current of which is to be measured, the field plate having a peripheral air gap at one transverse section thereof, a disk-like permanent magnet pivotally mounted in close proximity to the air gap on an axis substantially perpendicular to the plane of the air gap at the geometric center of the air gap, the plane of polarization of the magnet being generally parallel with the plane of the air gap, a pair of projections on the field plate extending symmetrically to diametrically opposite positions on either side of the magnet in proximity thereto and being closest to the magnet at said positions, whereby the field plate projections control the sensitivity of the ammeter and provide a zero return and biasing means for the magnet.

10. The combination claimed in claim 9 together with a frame and pairs of lugs on the ends of the field plate extending through apertures in the frame and rolled over the frame surface to secure the field plate to the frame and to define the air gap.

11. The combination claimed in claim 10 together with a pivot shaft secured to the frame in a position perpendicular to the plane of the air gap and extending through the geometric center of the air gap and rotatably receiving the magnet, a projection on the frame extending to a position adjacent the magnet end opposite its mounting end for preventing dislodgement of the magnet from the shaft, and a viscous fluid applied to the shaft to damp vibration of the magnet on the shaft.

12. An ammeter comprising a current conducting element, structure including a field plate portion of a nonpermanent magnetic material partially encircling a section of the element to concentrate flux generated by current flowing through the section in an air gap between the ends thereof, a disk-like permanent magnet rotatably mounted in proximity to the air gap on an axis generally perpendicular to the plane of the air gap with its plane of polarization generally parallel with the plane of the air gap, a portion of said structure formed of a nonpermanent magnetic material and having a pair of segments disposed in substantially diametrically opposite positions on either side of the magnet at an angle with the direction of the current produced flux, the segments being disposed in closer proximity to the magnet than the field plate portion to provide a zero return and biasing means for the magnet.

13. An ammeter comprising: a frame of nonmagnetic electrical current conducting material having a generally U-shaped section with a base and a pair of legs extending from one side of the base; a field plate of a non-permanent magnetic material carried on the one side of the base and having projections extending to the other side of the base to define a flux path with an air gap on said other side; a disk-like permanent magnet rotatably mounted in proximity to the air gap, on an axis generally perpendicular to the plane of the air gap, substantially at the geometric center of the air gap, and with its plane of polarization generally parallel to the plane of the air gap; and a pair of projections on the field plate extending to substantially diametrically opposite positions on either side of the magnet in proximity thereto and being closest to the magnet in a plane generally transverse to the length of the air gap at its geometric center, the latter projections being closer to the magnet than all other field plate portions to provide a zero return and biasing means for the magnet.

14. A low cost electric current actuated, moving magnet mechanism comprising a current conducting element of a nonmagnetic material, a field plate of a nonpermanent magnetic material partially encircling a longitudinal section of the element to define an internal low reluctance path portion for flux generated by current flowing in the element and having a transverse peripheral air gap defining an external flux path portion, a disk-like parmanent magnet rotatably mounted in proximity to the air gap on an axis generally perpendicular to the plane of the air gap with its plane of polarization generally parallel with the plane of the air gap, and a pair of projections on the field plate each having a segment disposed in substantially diametrically opposite positions on either side of the axis of the magnet and disposed closest to the magnet in such positions, such positions defining a plane disposed at an angle with the direction of the current produced flux in the air gap, whereby the field plate projections provide a zero return and biasing means for the magnet.

15. The mechanism of claim 14 together with a first electrical contact, a second electrical contact movable by the magnet into and out of circuit controlling engagement with the first contact at lower and higher values of current in the element, an electrical current conducting coil wound about the field plate to produce a biasing flux in the field plate opposing flux produced by current in the element, and means including the contacts providing circuit connections for the coil, whereby the coil produced flux prevents opening of the contacts until the achievement of a substantially higher value of current in the element than the value at which the contacts again engage incident to a reduction in current value.

16. The mechanism of claim 15 together with a spring opposing the zero return biasing force acting on the magnet and having a low torque relative to the biasing force for calibrating the mechanism.

17. A low cost electric current actuated, moving magnet mechanism comprising a current conducting element of a nonmagnetic material, a field plate of a nonpermanent magnetic material disposed generally annularly around a longitudinal section of the element to define an internal low reluctance path for flux generated by current flowing in the element, and having a transverse air gap defining an external flux path, a disk-like permanent magnet rotatably mounted in proximity to the air gap on an axis generally perpendicular to the plane of the air gap with its plane of polarization generally parallel with the plane of the air gap, and a pair of projections on the field plate extending symmetrically to diametrically opposite positions on either side of the axis of the magnet in proximity thereto and being closest to the magnet at points in a plane defining an angle with the direction of the current produced flux in the air gap, whereby the field plate projections provide a zero return and biasing means for the magnet.

18. The mechanism of claim 17 in which the element has low resistance preventing substantial heating by electric currents in the order of 60 amperes, together with a low torque calibration spring opposing the zero return biasing force acting on the magnet, a first electrical contact, a second electrical contact normally movable by the magnet into and out of circuit controlling engagement with the first contact when the current in the element is below and above a value in the order of 2 amperes, an electrical current conducting coil wound about the field plate to produce a biasing flux in the field plate opposing flux produced by current in the element and having an intensity in the order of the intensity of the flux produced by a 3 ampere current in the element, and means including the contacts providing circuit connections for the coil, whereby the coil produced flux prevents opening of the contacts until the achievement of a curent in the element having a value in the order of 5 amperes and permits subsequent reclosing of the contacts when the current in the element is at or less than a value in the order of 2 amperes.

19. A low cost electric current actuated moving magnet mechanism for accurately operating circuit controlling electrical contacts at current values substantially lower than the current values which the mechanism will accept without substantial heating comprising a current conducting element of a nonmagnetic material, a field plate of a nonpermanent magnetic material partially encircling a longitudinal section of the element to define an internal low reluctance path portion for flux generated by current flowing in the element and having a transverse peripheral air gap defining an external flux path portion, a disk-like permanent magnet rotatably mounted in proximity to the air gap on an axis generally perpendicular to the plane of the air gap with its plane of polarization generally parallel with the plane of the air gap, a pair of projections on the field plate each having a segment disposed in substantially diametrically opposite positions on either side of the axis of the magnet and disposed closest to the magnet in such positions, such positions defining a plane disposed at an angle with the direction of the current produced flux in the air gap, whereby the field plate projections provide a zero return and biasing means for the magnet, and a coil wound around the field plate adapted to be energized at predetermined low values of current and to be deenergized at higher values of current to further bias the magnet toward zero when it is energized.

20. A low cost electric current actuated, moving magnet mechanism comprising a current conducting element of a nonmagnetic material, a field plate of a nonpermanent magnetic material partially encircling a section of the element to define an internal low reluctance path portion for flux generated by current flowing in the element and having a transverse peripheral air gap defining an external flux path portion, and a permanent magnet rotatably mounted in proximity to the air gap on an axis generally perpendicular to the plane of the air gap and having diametrically opposed arcuate pole portions, the field plate having a pair of projections each including a segment disposed in substantially diametrically opposite positions on either side of the axis of the magnet and in such positions being the portions of the field plate closest to the magnet, such positions defining a plane disposed at an angle with the direction of the current produced flux in the air gap, whereby the field plate projections provide a zero return and biasing means for the magnet.

21. A low cost electrical current actuated, moving magnet mechanism for accurately operating circuit controlling electrical contacts at curent values substantially lower than the current values which the mechanism will accept without substantial heating comprising a current conducting element of a nonmagnetic material, a field plate of a nonpermanent magnetic material partially encircling a section of the element to define an internal low reluctance path portion for flux generated by current flow in the element and having a transverse peripheral air gap defining an external flux path portion, a permanent magnet rotatably mounted in proximity to the air gap on an axis generally perpendicular to the plane of the air gap and having diametrically opposed poles, a pair of projections on the field plate each having a segment disposed in substantially diametrically opposite positions on either side of the axis of the magnet and in such positions being the portions of the field plate closest to the magnet, such positions defining a plane disposed at an angle with the directions of the current produced flux in the air gap, whereby the field plate projections provide a zero return and biasing means for the magnet.

22. A low cost electric current actuated, moving magnet mechanism comprising a current conducting element, nonpermanent magnetic means partially encircling and supported by said electrical conductor, said magnetic means having a pair of spaced projections extending symmetrically from each side of said current conducting element and defining therewith an internal low reluctance path portion for flux generated by current flowing in the element and a high reluctance air gap external flux path portion transverse to said element, a permanent magnet rotatably mounted between said pairs of projections within said external flux path on an axis generally perpendicular to the external flux path and having diametrically opposed arcuate pole portions with its plane of polarization generally perpendicular to said axis, said magnetic means having another pair of projections defining therewith another low reluctance flux path including a pair of segments disposed closely to said magnet in substantially diametrically opposite positions on either side of the axis of the magnet and in such positions being the portions of any of said projections closest to the magnet, said segments in such positions defining a plane with said axis disposed at an angle with the direction of the current produced flux in the air gap, whereby said other projections provide a zero return and biasing means for the magnet.

23. The mechanism of claim 22 wherein said first projecting means comprises a pair of symmetrically spaced lugs disposed on either side of said conducting element and extending into the air gap to further define the current produced flux path to limit the maximum angular displacement of the magnet from its zero return position.

24. A low cost ammeter mechanism comprising a current conducting element, a nonpermanent magnetic field plate partially encircling said element defining an internal low reluctance path portion for flux generated by current flowing in the element and having an air gap defining an external flux path, a pair of spaced lugs projecting from each edge of said field plate adjacent the air gap and extending into the air gap to further define the current produced flux path, a disk-like permanent magnet rotatably mounted in proximity to the air gap on an axis generally perpendicular to the external flux path with its plane of polarization generally parallel with the plane of the air gap, each lug of one of said pairs of lugs having segments extending to diametrically opposite positions on either side of the magnet in proximity thereto and being closest to the magnet in a plane defining an angle with the current produced flux in the air gap, whereby the segments control the sensitivity of the mechanism and provide a zero return, zero adjust and biasing means for the magnet.

25. A low cost electric current actuated, moving magnet mechanism comprising a current conducting element, a nonpermanent magnetic field plate partially encircling said element defining an internal low reluctance path portion for flux generated by current flowing in the element and having an air gap defining an external flux path transverse to said element, a pair of spaced lugs projecting from each edge of said field plate adjacent the air gap and extending into the air gap to further define the current produced flux path, a disk-like permanent magnet rotatably mounted in proximity to the air gap on an axis generally perpendicular to the external flux path with its plane of polarization generally parallel with the plane of the air gap, one of said lugs projecting from one edge of said field plate having an extension with a segment positioned on one side of the magnet in proximity thereto, one of said lugs projecting from the other edge of said field plate having an extension with a segment positioned on the diametrically opposite side of said magnet in proximity thereto, said segments being closer to said magnet than the remainder of said extensions and defining a plane representing a zero return position for said magnet at an angle with the current produced flux in the air gap, whereby the current required to rotate said magnet from said zero return position is greater for current flow in one direction in said element than for current flow in the other direction.

References Cited in the file of this patent
UNITED STATES PATENTS
2,624,769   Diehl ------------------ Jan. 6, 1953